(12) United States Patent
Grogan et al.

(10) Patent No.: US 6,402,160 B1
(45) Date of Patent: Jun. 11, 2002

(54) CHUCK WITH IMPROVED BEARING

(75) Inventors: Robert A. Grogan, Salem; William H. Aultman, Pickens; Gary L. Young, Six Mile; J. Larry Wilson, Belton; Mark S. Huggins, Clemson, all of SC (US)

(73) Assignee: Power Tool Holders Incorporated, Christiana, DE (US)

( * ) Notice: Subject to any disclaimer, the term of this patent is extended or adjusted under 35 U.S.C. 154(b) by 0 days.

(21) Appl. No.: 09/507,575

(22) Filed: Feb. 18, 2000

(51) Int. Cl.[7] ............................................... B23B 31/12
(52) U.S. Cl. ........................ 279/61; 279/140; 279/902; 408/240
(58) Field of Search ............................. 279/60–65, 140, 279/902; 408/240

(56) References Cited

U.S. PATENT DOCUMENTS

| | | |
|---|---|---|
| 282,015 A | 7/1883 | Todd |
| 549,837 A | 11/1895 | Weir |
| 553,531 A | 1/1896 | Long |
| 558,242 A | 4/1896 | Weir |
| 562,421 A | 6/1896 | Richards |
| 813,864 A * | 2/1906 | Coit ............................ 279/61 |
| 1,195,214 A | 8/1916 | Hapgood |
| 1,509,061 A | 8/1924 | Hardwicke |
| 2,550,871 A | 5/1951 | Sharp ........................... 279/60 |
| 3,582,097 A | 6/1971 | Elliott, Jr. ..................... 279/61 |
| 3,861,693 A | 1/1975 | Huber ........................... 279/61 |
| 5,145,194 A | 9/1992 | Huff et al. ..................... 279/62 |
| 5,174,588 A * | 12/1992 | Reibetanz et al. ............. 279/62 |
| 5,503,409 A * | 4/1996 | Rohm ........................... 279/62 |
| 5,573,254 A | 11/1996 | Huff et al. ..................... 279/62 |
| 6,217,033 B1 * | 4/2001 | Sakamaki et al. ............. 279/62 |

FOREIGN PATENT DOCUMENTS

| | | |
|---|---|---|
| GB | 0556523 | 10/1943 |
| GB | 0705764 | 3/1954 |
| GB | 0741609 | 12/1955 |

OTHER PUBLICATIONS

Chuck Assembly Drawing.

* cited by examiner

*Primary Examiner*—Steven C. Bishop
(74) *Attorney, Agent, or Firm*—Nelson Mullins Riley & Scarborough, LLP

(57) ABSTRACT

A chuck includes a generally cylindrical body, a plurality of jaws and a driving disk. A bearing includes a first race, a second race and a plurality of bearing elements disposed between the first race and the second race. The first race defines a plurality of recesses therein. One of the second race and the bearing elements is disposed in communication with the first race so that, when the jaws close onto a tool and the first race and the second race rotate relative to each other, the one of the second race and the bearing elements engages successive recesses.

29 Claims, 15 Drawing Sheets

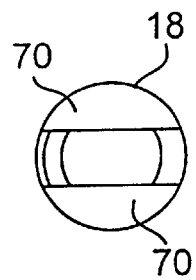
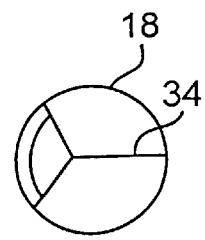
FIG. 7A  FIG. 7E
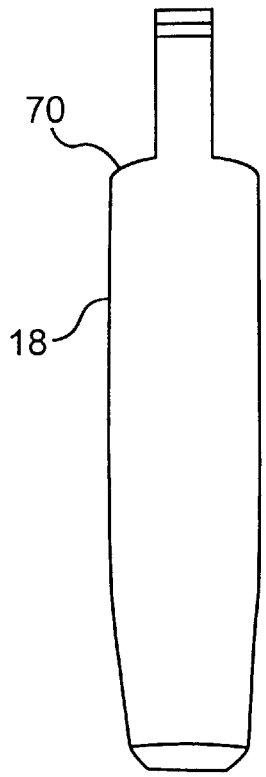
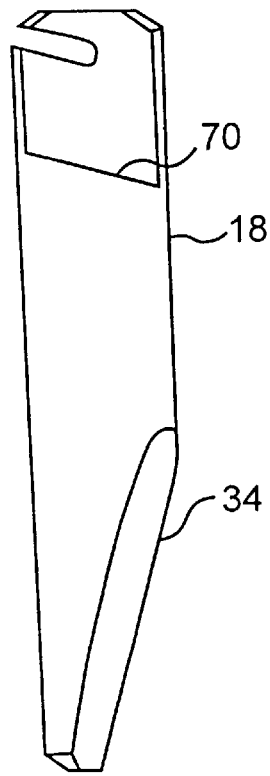
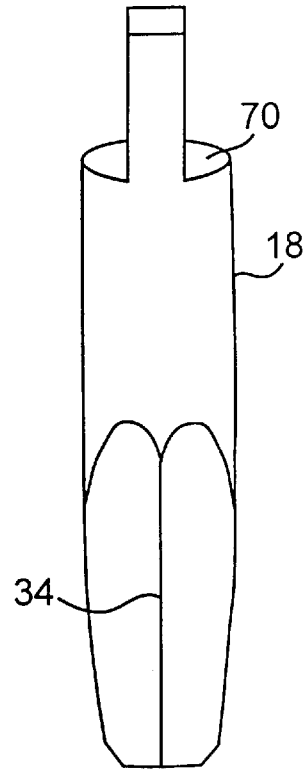
FIG. 7C  FIG. 7B  FIG. 7D

US 6,402,160 B1

CHUCK WITH IMPROVED BEARING

BACKGROUND OF THE INVENTION

The present invention relates generally to chucks for use with drills or with electric or pneumatic power drivers. More particularly, the present invention relates to a chuck of the keyless type which may be tightened or loosened by hand or by actuation of the driver motor.

Both hand and electric or pneumatic tool drivers are well known. Although twist drills are the most common tools used with such drivers, the tools may also comprise screwdrivers, nut drivers, burrs, mounted grinding stones, and other cutting or abrading tools. Since the tools may have shanks of varying diameter or may have a polygonal cross-section, the device is usually provided with a chuck that is adjustable over a relatively wide range. The chuck may be attached to the driver by a threaded or tapered bore.

A wide variety of chucks have been developed in the art. In one form of chuck, three jaws spaced circumferentially approximately 120° apart from each other are constrained by angularly disposed passageways in a body attached to the drive shaft. The chuck is configured so that rotation of the body in one direction with respect to a constrained nut forces the jaws into or away from gripping relationship with a tool shank. Such a chuck may be keyless if it can be tightened or loosened by manual rotation. An example of such chuck is disclosed in U.S. Pat. No. 5,125,673, commonly assigned to the present assignee and the entire disclosure of which is incorporated herein by this reference.

SUMMARY OF THE INVENTION

The present invention recognizes and addresses disadvantages of prior art construction and methods.

Accordingly, it is an object of the present invention to provide an improved chuck for use with a power driver.

This and other objects are achieved by a chuck for use with a power driver having a rotatable spindle. The chuck includes a generally cylindrical body defining a tail section configured to rotate with the spindle of the power driver and a nose section having an axial bore formed therein. A plurality of jaws are in communication with the axial bore. A driving disk is rotatably mounted about the body in driving engagement with the jaws so that rotation of the driving disk with respect to the body moves the jaws toward or away from the axis of the axial bore, depending on the direction of rotation. A bearing is disposed between the driving disk and the body so that rearward axial force is transferred from the driving disk to the body through the bearing when the jaws close onto a tool received in the axial bore. The bearing includes a first race, a second race and a plurality of bearing elements disposed between the first race and the second race. The first race defines a plurality of recesses therein. One of the second race and the bearing elements is disposed in communication with the first race so that, when the jaws close onto the tool and the first and second races rotate relative to each other, the one of the second race and the bearing elements engages successive recesses.

In another embodiment, a chuck includes a generally cylindrical body that defines a tail section configured to rotate with the spindle of the power driver and a nose section having an axial bore formed therein. A plurality of jaws are in communication with the axial bore. A driving disk is axially moveably disposed about the body in driving engagement with the jaws so that axial movement of the driving disk with respect to the body moves the jaws toward or away from the axis of the axial bore, depending on the direction of the axial movement. The driving disk defines a threaded outer circumferential surface. A generally cylindrical sleeve is rotatably mounted about the body and defines a threaded inner circumferential surface engaging the threaded outer surface of the driving disk so that relative rotation between the driving disk and the sleeve moves the driving disk axially with respect to the body. A bearing is disposed between the driving disk and the sleeve so that rearward axial force is transferred from the sleeve to the body through the bearing when the jaws close onto a tool received in the axial bore. The bearing includes a first race, a second race and a plurality of bearing elements disposed between the first race and the second race. The first race defines a plurality of recesses. One of the first race and the bearing elements is disposed in communication with the first race so that, when the jaws close onto the tool and the first race and the second race rotate relative to each other, the one of the second race and the bearing elements engages successive recesses.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying figures, in which:

FIG. 7A is a rear view of a jaw as shown in FIG. 6;

FIG. 7B is a side view of a jaw as shown in FIG. 6;

FIG. 7C is a top view of a jaw as shown in FIG. 6;

FIG. 7D is a bottom view of a jaw as shown in FIG. 6;

FIG. 7E is a front view of a jaw as shown in FIG. 6;

Figure 1:
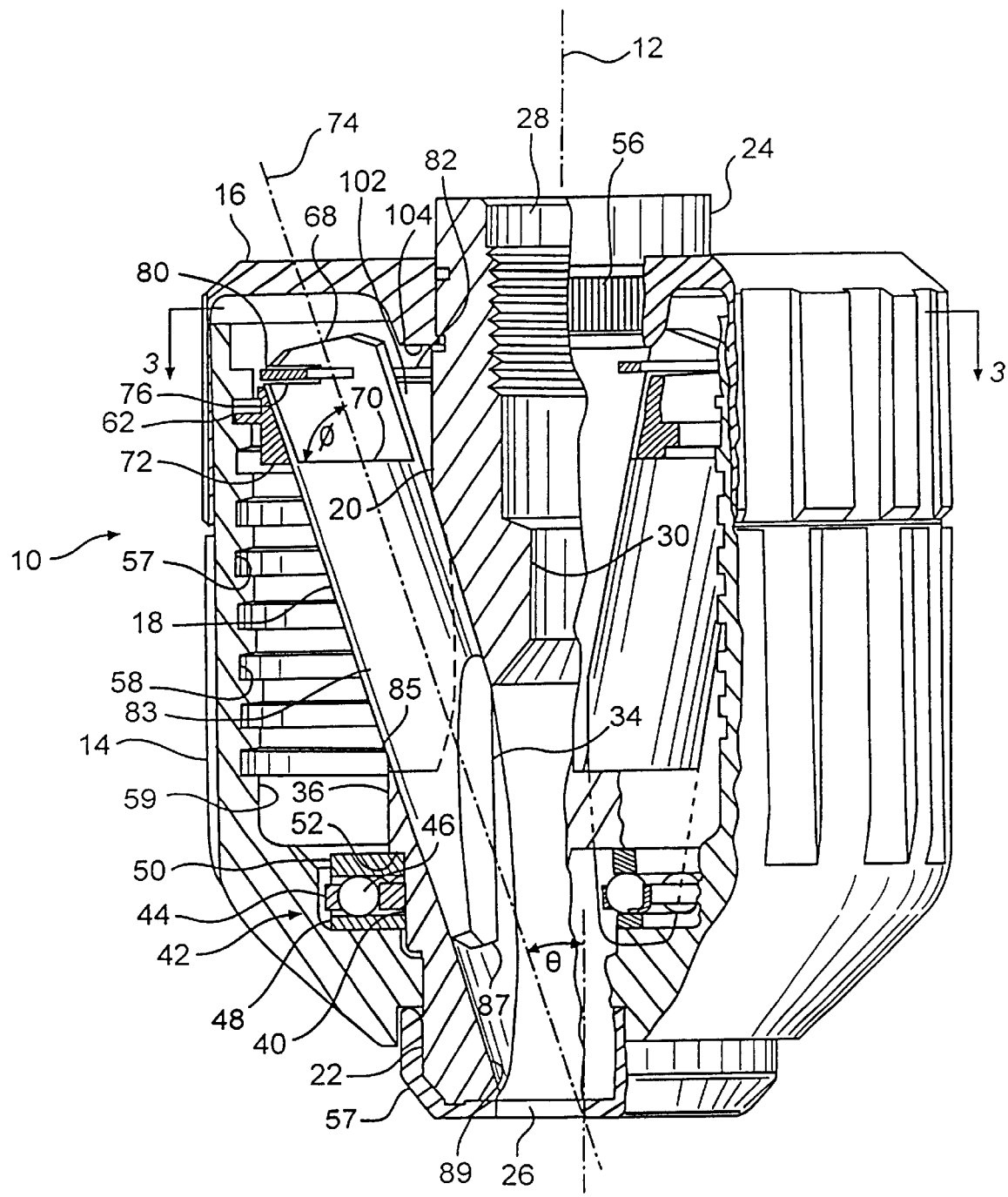
FIG. 1 is a front plan view, partly in section, of a chuck in accordance with a preferred embodiment of the present invention.

Repeat use of reference characters in the present specification and drawings is intended to represent same or analogous features or elements of the invention.

DETAILED DESCRIPTION OF PREFERRED EMBODIMENTS

It is to be understood by one of ordinary skill in the art that the present discussion is a description of one or more exemplary embodiments only and is not intended as limiting the broader aspects of the present invention, which broader aspects are embodied in the exemplary construction.

Figure 5:
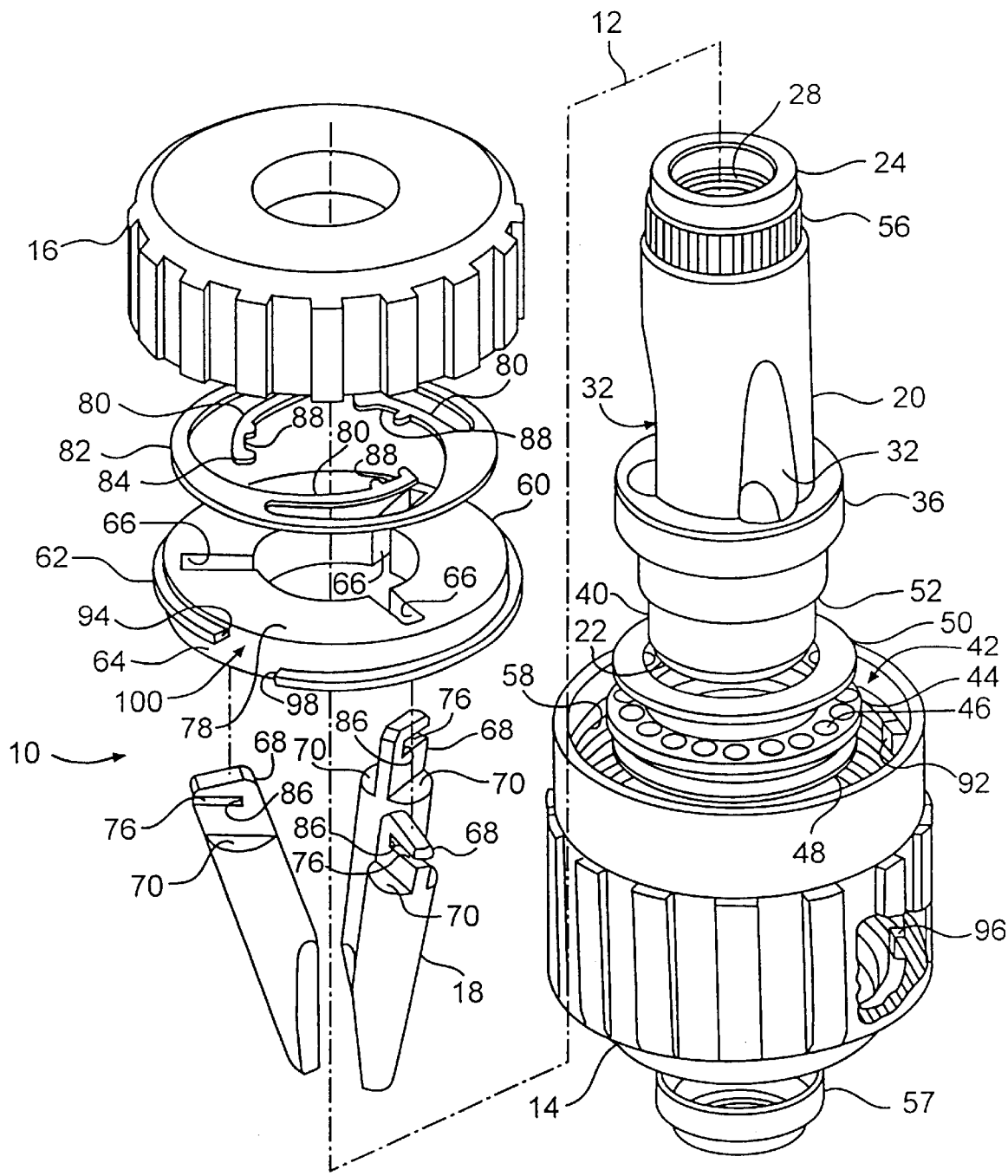
FIG. 5 is an exploded view of the chuck as in FIG. 1.
Figure 6:
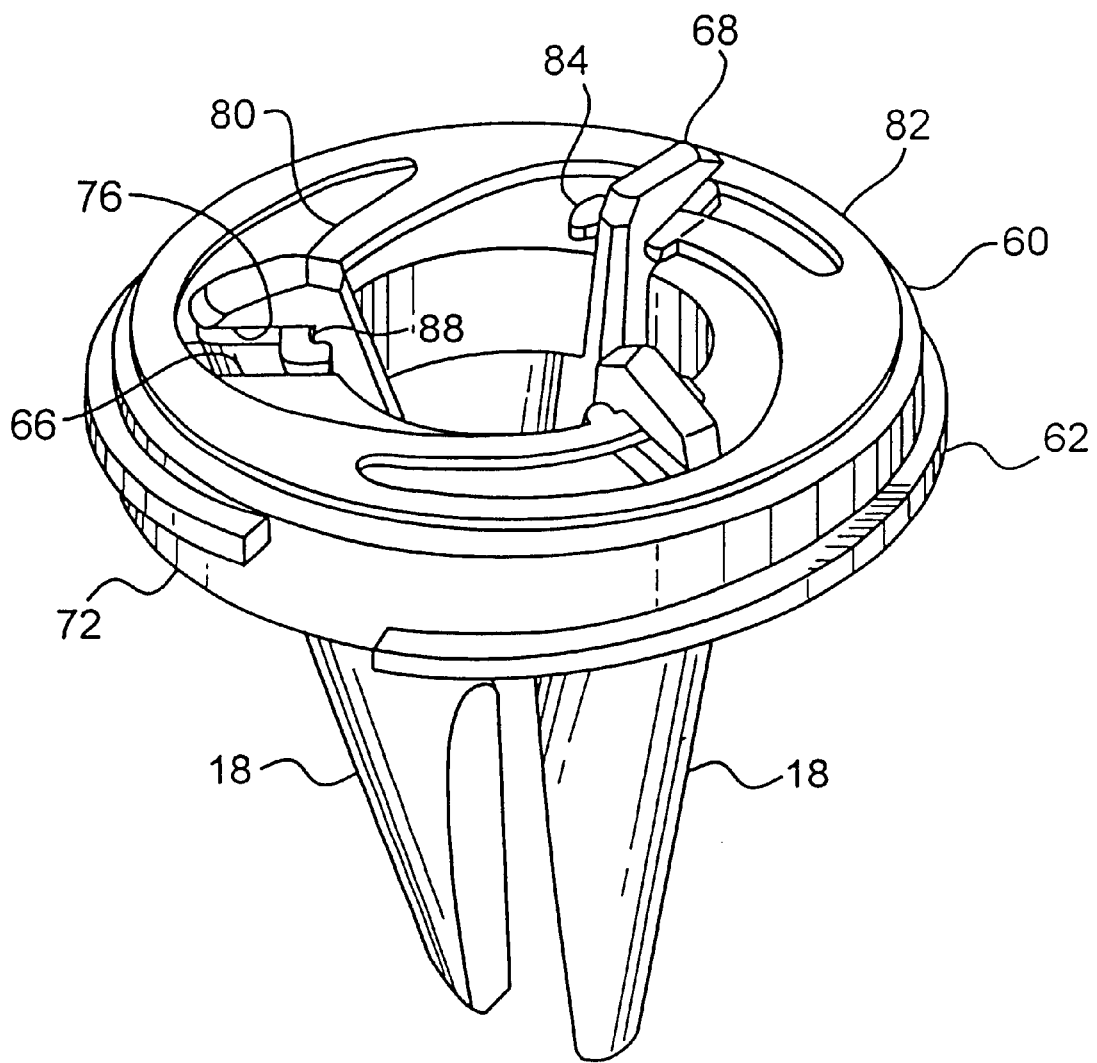
FIG. 6 is a perspective view of the driving disk, back ring and jaws of the chuck as in FIG. 1.

Referring generally to FIGS. 1 and 5, a chuck 10 in accordance with the present invention has a central longitudinal axis depicted by the dashed line designated at 12. Chuck 10 includes a front sleeve 14, an optional rear sleeve 16 and a plurality of jaws 18. A body 20 is generally cylindrical in shape and comprises a nose or forward section 22 and a tail or rearward section 24. An axial bore 26 is formed in the nose section and is somewhat larger than the largest tool shank that the chuck is designed to accommodate. As should be understood in this art, body 20 may be formed from steel bar stock or any other suitable material.

Body 20 defines threaded bore 28 in its tail section. Bore 28 is of a standard size to mate with the drive shaft of a powered or hand driver (not shown). While a threaded bore 28 is illustrated, such bore could be replaced with a tapered bore of a standard size to mate with a tapered drive shaft. The bores 26, 28 may communicate at a central region 30 of body 20. Central region 30 may be formed with a socket to accept a drive bit so that the body may be screwed onto the spindle by the bit. Such a socket configuration is described in U.S. Pat. No. 5,193,824, incorporated herein by reference.

Body 20 also defines three passageways 32 to respectively accommodate the three jaws 18. In a three-jaw configuration, each passageway, and therefore each jaw, is separated from each adjacent passageway by an arc of approximately 120°. The longitudinal axes of the passageways 32 and the jaws 28 are angled with respect to the chuck's longitudinal axis 12 but intersect the chuck axis at a common point ahead of chuck body 20. Referring also to FIGS. 7B, 7D and 7E, each jaw 18 has a tool engaging face 34 that is generally parallel to the longitudinal axis of chuck body 20.

Body 20 includes a thrust ring member 36, which in a preferred embodiment forms an integral part of the body. Although not presently preferred, the thrust ring may be a separate component from the body's main portion. As shown in FIGS. 1 and 5, thrust ring 36 includes a ledge portion 40 that receives a bearing assembly 42. The bearing assembly includes a bearing cage 44 enclosing bearing balls 46 that forwardly bear, with respect to chuck body 20, on a forward washer 48 and rearwardly bear on a rearward washer 50. Rearward race 50 abuts a shoulder surface 52 formed between the raised and ledge portions of thrust ring 36. Forward race 48 bears in an axially forward direction against a shoulder 54 of sleeve 14. Bearing assembly 42 may comprise any suitable construction, for example a bearing assembly of the type described in U.S. Pat. No. 5,348,318, incorporated herein by reference.

Tail section 24 of body 20 can include a rear cylindrical portion having a knurled surface 56 thereon for receipt of rear sleeve 16. The rear sleeve may be pressed onto the knurled surface, or could be retained in place by press fit without knurling or by use of a key. It could also be retained by crimping, staking, riveting, threading or any other suitable securing mechanism. Where front and rear sleeves 14 and 16 are replaced by a single sleeve extending substantially the length of body 20, a retaining disk may be pressed or otherwise retained on tail section 24 to maintain the sleeve on the body in the rearward direction.

At the front end of the chuck, nose section 22 is beveled and is adapted to receive a nosepiece 57 for restraining front sleeve 14 from forward axial movement with respect to the chuck body. Alternatively, a snap ring or other suitable mechanism may be used to axially restrain the sleeve. Nosepiece 57 may be pressed onto nose section 22 or attached in any other suitable manner. Rearward axial movement of the sleeve on the body is prevented by thrust ring 36 through bearing assembly 42.

The outer circumferential surface of sleeve 14 may be knurled or may be provided with longitudinal ribs or other protrusions to enable the operator to grip it securely. In like manner, the circumferential surface of rear sleeve 16, if employed, may be knurled or ribbed if desired. The front and rear sleeves may be fabricated from a structural plastic such as polycarbonate, a filled polypropylene, for example glass filled polypropylene, or a blend of structural plastic materials. Other composite materials such as, for example, graphite filled polymerics could also be suitable in certain environments. Further, the sleeves may be constructed from suitable metals, such as steel. As would be appreciated by one skilled in the art, the materials from which the chuck of the present invention is fabricated will depend on the end use of the chuck, and the above are provided by way of example only.

The interior surface 59 of sleeve 14 defines female threads 58. The threads are a modified square thread formation in an eight pitch configuration along the length of sleeve 14. It should be understood, however, that any suitable thread shape or formation may be employed, for example including a modified buttress thread. In one preferred embodiment, the squared interface 57 between the outer surface and back side of thread 58 is replaced by a curved surface.

A driving disk 60 includes a male thread 62 extending about an outer circumferential surface 64. Thread 62 has the same pitch as thread 58 so that when thread 62 is received by thread 58, relative rotation between sleeve 14 and driving disk 60 moves the driving disk axially within the sleeve. In particular where the driving disk is molded, thread 62 may have sloped sides, for example at an approximately 5° slope, extending from surface 64 to the thread's outer diameter.

Referring also to FIGS. 6 and 7A–7E, driving disk 60 includes three equiangularly spaced apart slots 66 extending axially through the driving disk and receiving respective end sections 68 of jaws 18 therethrough. Each end section has a generally rectangular cross-section that corresponds to the cross-section of its slot 66 so that the slot slidably receives the jaw end section but prevents rotation of the jaw about the jaw's axis.

Each end section 68 meets the generally cylindrical main portion of the jaw at an interface that defines two shoulders 70 on respective sides of the end section. The shoulders are formed at an angle $\Phi$ between jaw axis 74 and a plane defined by shoulders 70 so that when the jaws are received in slots 32 of body 20, the shoulders are flush against a flat front face 72 of driving disk 60. In one preferred embodiment, front face 72 is perpendicular to the chuck axis, and angle $\Phi$ is therefore equal to 90° minus an angle $\Theta$ between jaw axis 74 and chuck axis 12.

Each end section 68 also defines a slot 76 extending generally radially into the end section parallel to the shoulders 70. The end sections extend through the slots 66 so that slots 76 are rearward of and parallel to a flat rear face 78 of driving disk 60.

Each slot 76 receives a respective elongated spring arm 80 that extends inward from and generally circumferentially within a steel back ring 82. Arms 80 bias their distal ends 84 radially inward with respect to back ring 82. Thus, ends 84 engage closed ends 86 of slots 76 at respective grooves 88. Grooves 88 grip the jaw end sections to restrain rotation of ring 82 about chuck axis 12 when jaws 18 are received in slots 32. Furthermore, arms 80 axially fix ring 82 with respect to the jaws.

Shoulders 70 and back ring 82 axially fix the jaws to driving disk 60. Furthermore, the jaws pass both through driving disk slots 66 and body slots 32, thereby rotationally securing the driving disk with respect to the body. Since the driving disk cannot rotate with respect to the body, rotation of sleeve 14 with respect to the body moves driving disk 60 axially with respect to chuck axis 12 by the cooperation between threads 62 and 58. Depending on the sleeve's rotational direction, the driving disk moves axially forward or backward on the body and bears on either shoulders 70 or back ring 82 to move jaws 18 axially in slots 32 to an open or closed position.

Figure 2:
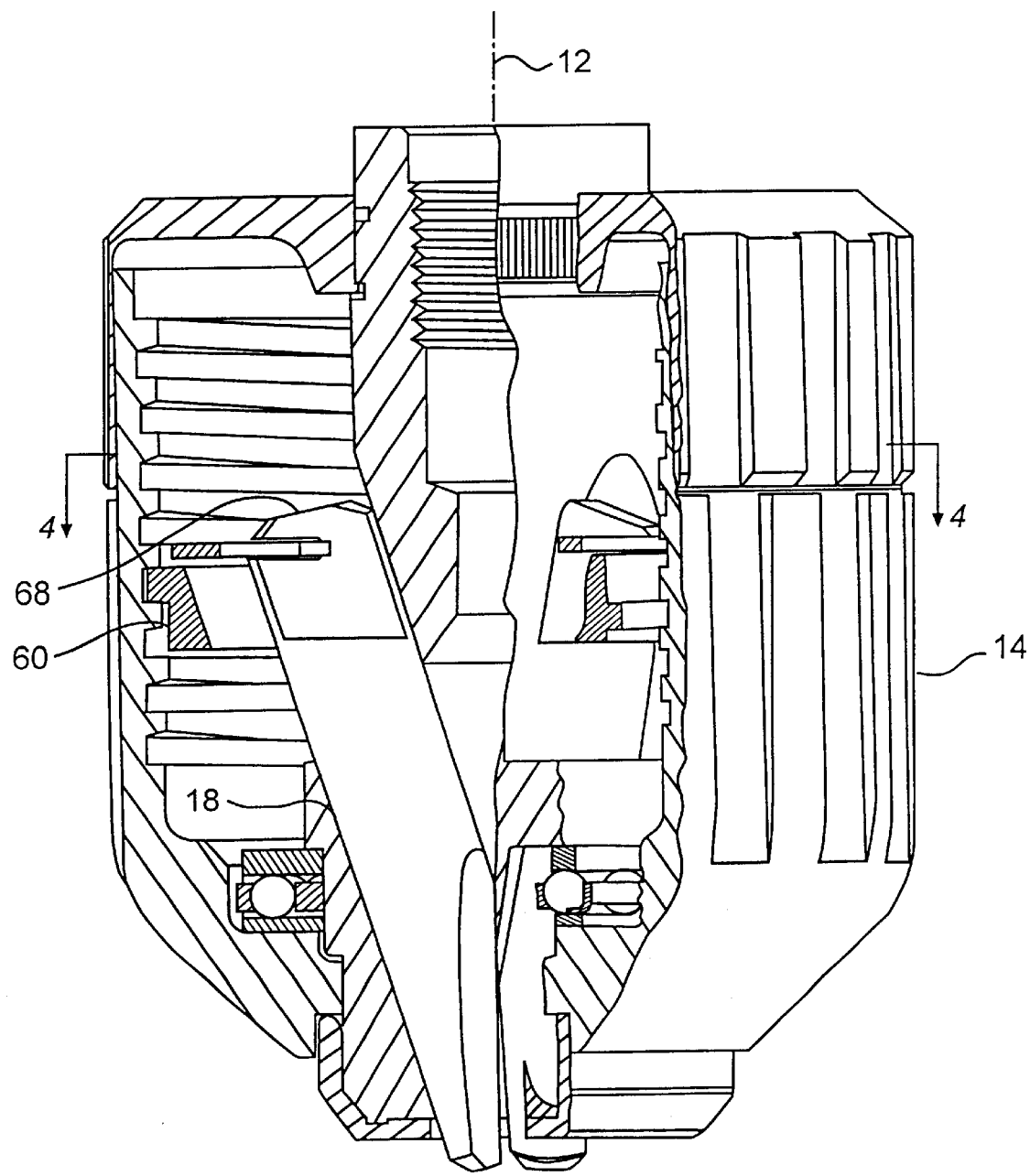
FIG. 2 is a front plan view, partly in section, of the chuck as in FIG. 1 in a closed position.
Figure 3:
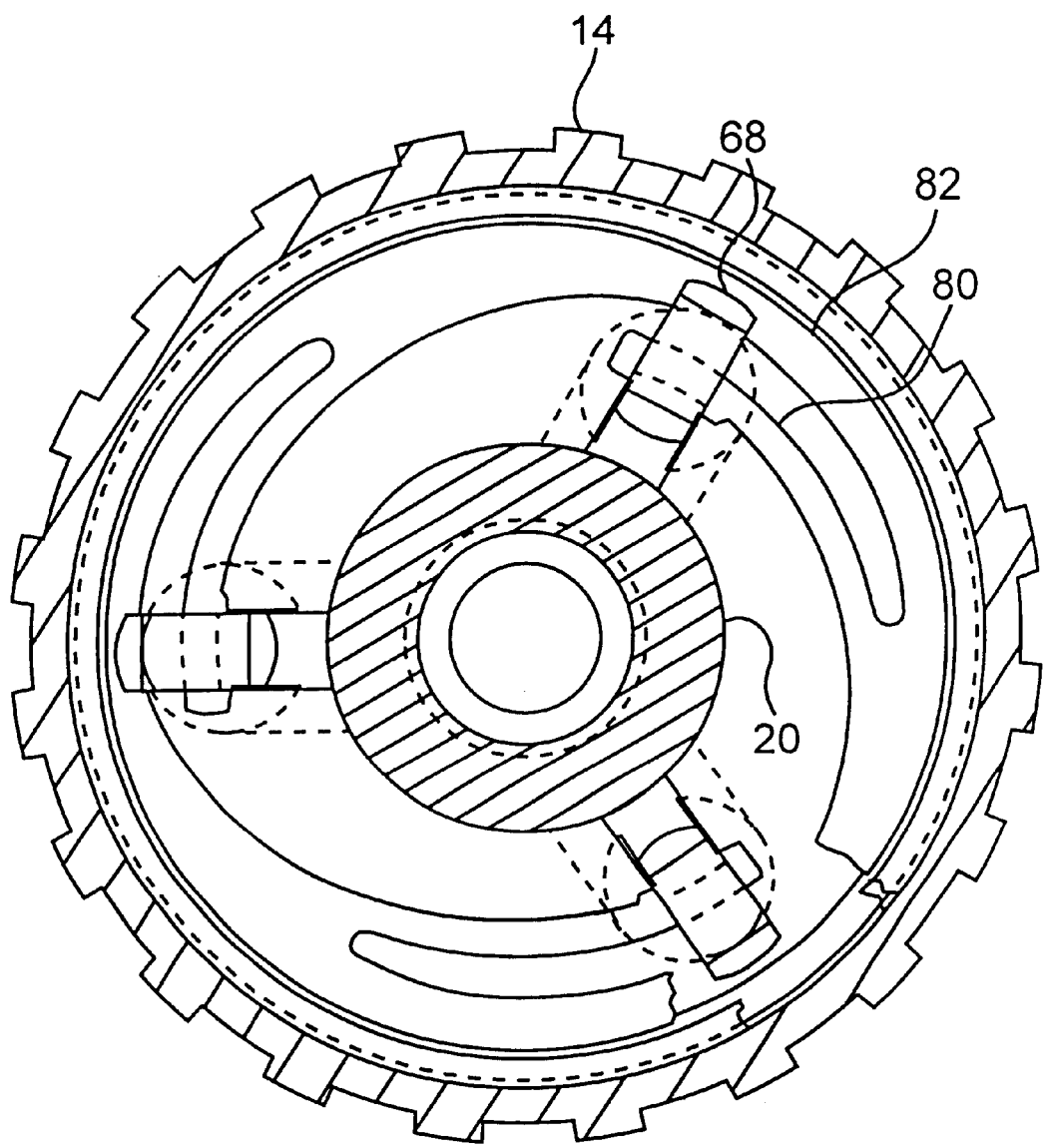
FIG. 3 is a cross-sectional view of the chuck as in FIG. 1 taken along the line 3—3.
Figure 4:
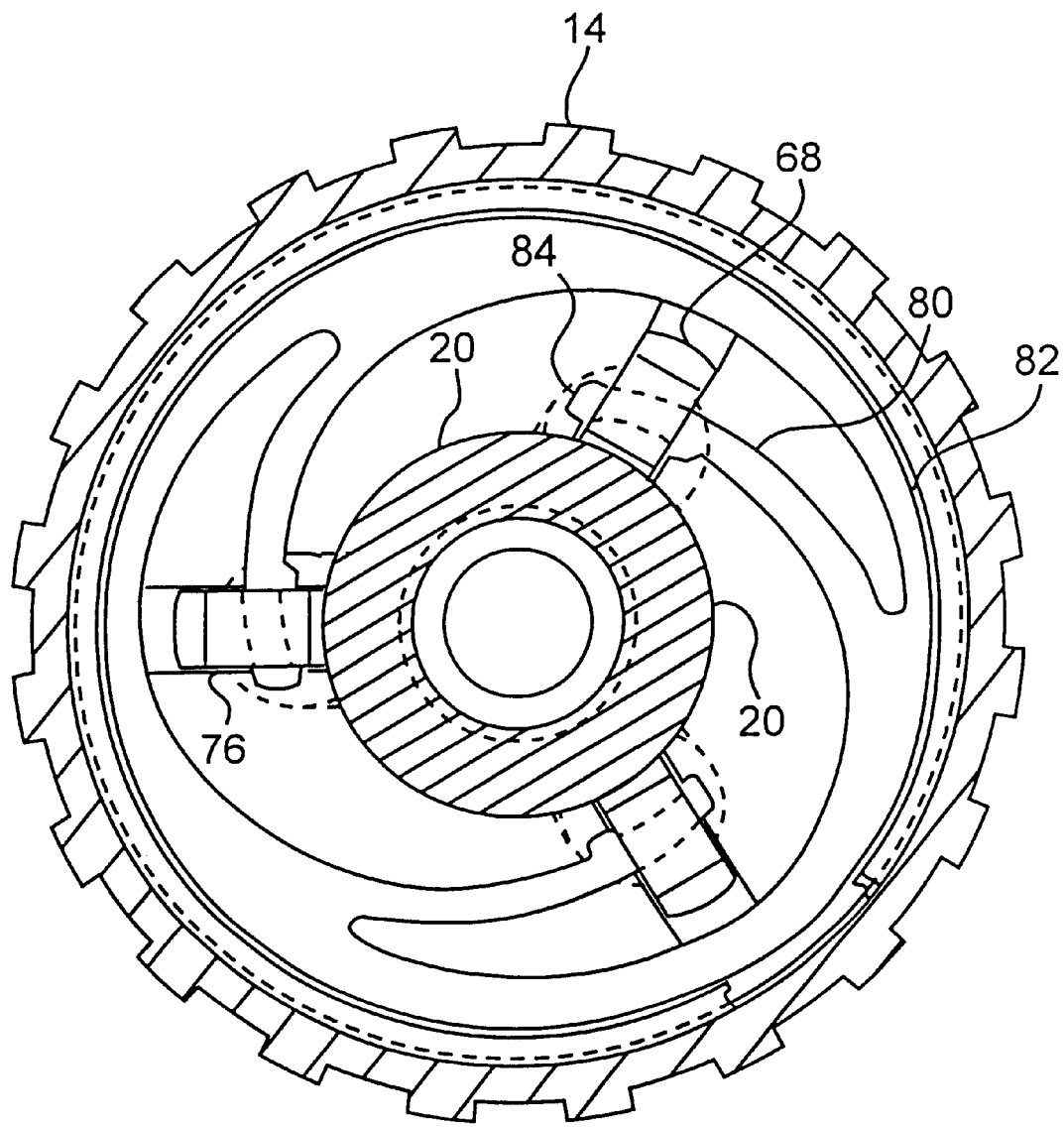
FIG. 4 is a cross-sectional view of the chuck as in FIG. 2 taken along the line 4—4.

FIG. 1 shows jaws 18 retracted to a fully open position. Referring to FIG. 3, jaw end sections 68 are at their radially outwardmost position with respect to the chuck axis. As seen in FIG. 2, however, end sections 68 move radially inward toward axis 12 as the front sleeve's rotation moves driving disk 60 forward and jaws 18 to a closed position. Referring to FIG. 4, distal ends 84 nevertheless remain engaged in slots 76 due to the radially inward bias of arms 80.

Spring arms 80 help to maintain the jaws in an aligned position in passageways 32. Specifically, as jaws 80 are pushed axially forward toward the chuck nose, the jaw outer surfaces 83 tend to push against an edge 85 defined by body 20 at the outer edge of passageways 32. The jaws could pivot on this edge, pushing jaw noses 87 radially inward and end sections 68 radially outward. The spring arms, however, apply a radially inward force upstream of the passageways. This biases the jaws' outer surface 83 against each passageway's inner surface 89 and thereby restrains the jaws from pivoting at edge 85.

Figure 8:
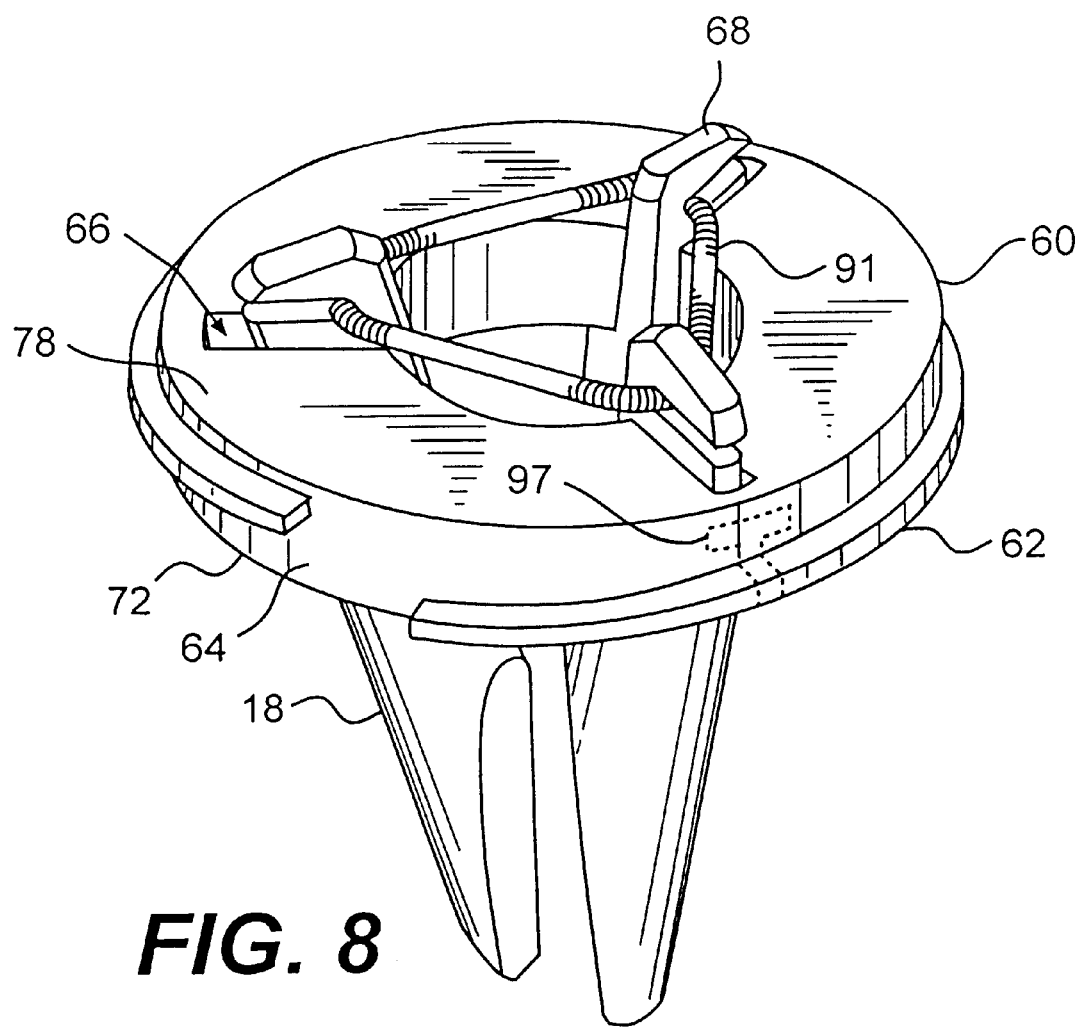
FIG. 8 is a perspective view of a driving disk, spring retainer and jaws for use in a chuck in accordance with a preferred embodiment of the present invention.

Any suitable mechanism may be used to retain the jaws axially within the jaw passageways. For example, referring to a driving disk and jaw assembly shown in FIG. 8, back ring 82 (FIG. 6) may be replaced by a garter spring 91 or any other suitable retainer, such as an expandable polymer collar, that applies a radially inward force to jaw end sections 68. The driving disk pushes the jaws back in an opening direction through the garter spring. Alternatively, the driving disk may be formed with T-shaped slots, one of which is indicated in phantom at 97, instead of slots 66. Each of three equiangularly spaced slots 97 extends radially into the driving disk from surface 64 parallel to front and rear faces 72 and 78, and may extend entirely through the disk. Jaw end sections 68 are formed in a corresponding T-shape so that slots 97 slidably receive respective jaws. The slots allow the jaw ends to move radially as the driving disk moves the jaws between open and closed positions. A dry lubricant coating may be provided on the jaw ends and/or slots 97 to facilitate this movement. The cooperation between the jaw ends and slots 97 maintains the jaws at the proper angle with respect to the driving disk so that the jaws are maintained in alignment in the jaw passageways in the assembled chuck. In either of these embodiments, the chuck is otherwise constructed as shown in FIGS. 1, 2 and 5.

Figure 9B:
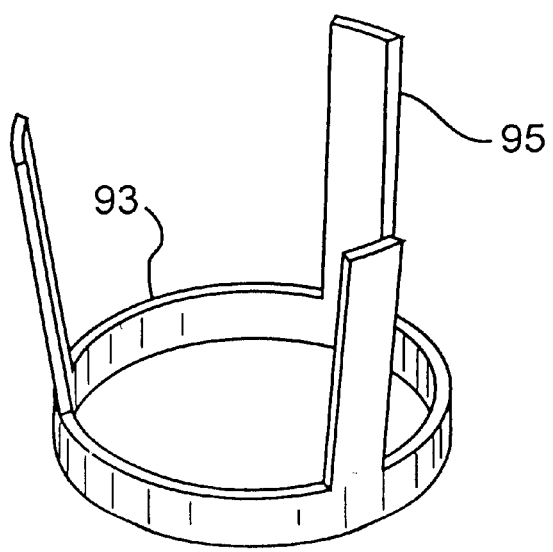
FIG. 9B is a perspective view of a guide ring as shown with the chuck in FIG. 9A.
Figure 9A:
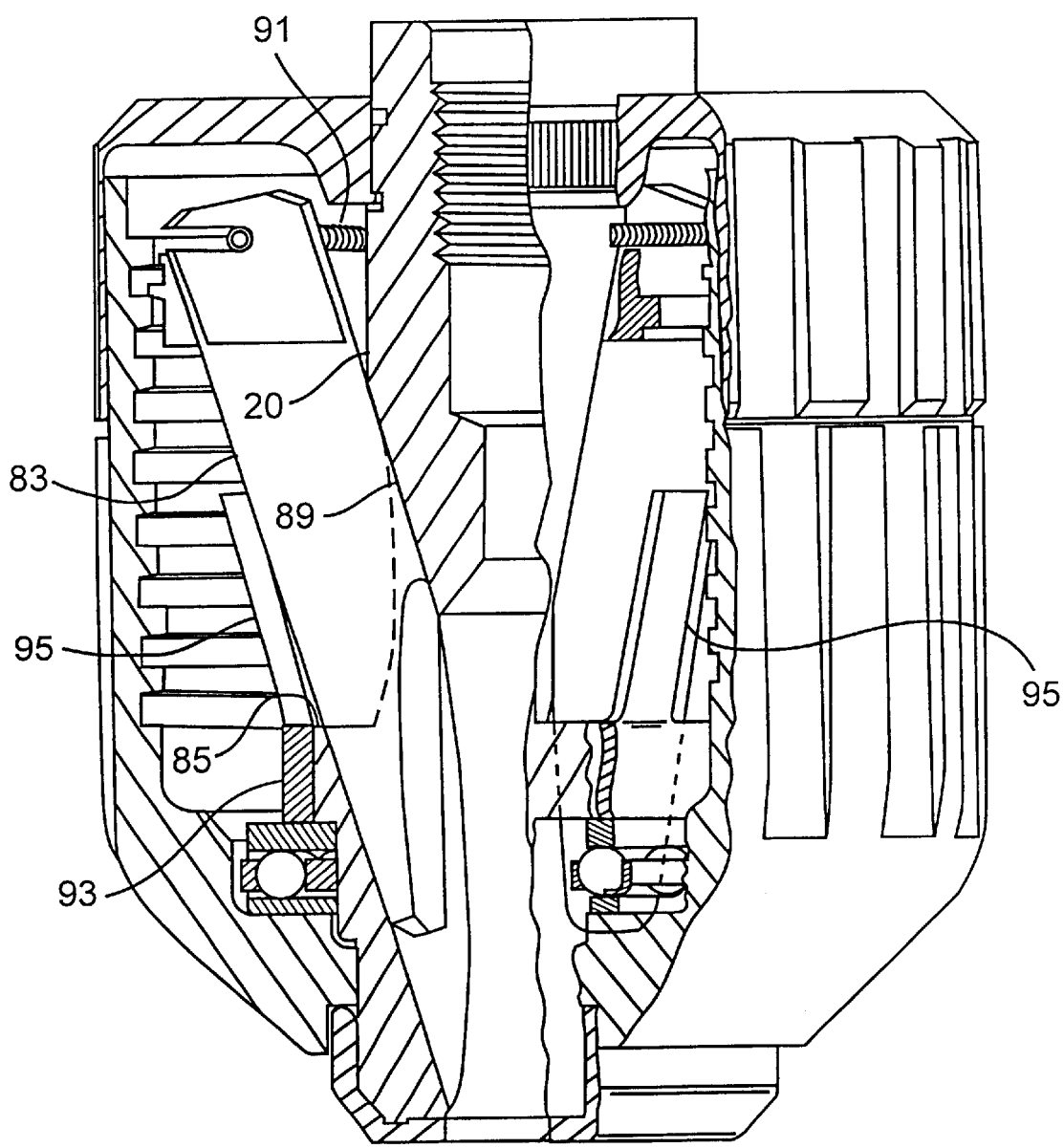
FIG. 9A is a front plan view, partly in section, of a chuck in accordance with a preferred embodiment of the present invention.

Referring to still another preferred embodiment of a chuck 10 shown in FIGS. 9A and 9B, a guide ring 93 is pressed onto body 20. Three equiangularly spaced prongs 95 extend from ring 93 against respective jaw outer surfaces 83. The prongs abut each jaw opposite (i.e. directly across the jaw's diameter from) the passageway surface 89 upstream from edge 85. This prevents the jaws from pivoting outward behind edge 85 and thereby maintains the jaws in axial alignment with the passageways. Garter spring 91 provides an expandable collar through which the driving disk drives the jaws to an open position and provides additional inward bias. A T-slot construction as described above, or the back ring 82 (FIG. 6), could be used instead of an expandable collar.

Referring again to FIGS. 1 through 7, when jaws 18 clamp onto a tool shank, rearward axial force is translated to front sleeve 14 through the jaws and the driving disk. This force is transferred to body 20 through bearing assembly 42 at shoulder 52.

Rotation of sleeve 14 clockwise, when viewed from nose section 22, moves driving disk 60 axially forward with respect to chuck axis 12, thereby moving jaws 18 to a closed position. Conversely, counterclockwise rotation of the front sleeve moves the jaws in an opening direction. Referring also to FIG. 5, a stop 92 is provided at the rear edge of thread 58. When the jaws reach a fully open position as shown in FIG. 1, a rear edge 94 of thread 62 abuts stop 92. This prevents further rotation of the sleeve with respect to the driving disk and thereby prevents the jaws from binding in the chuck's rear area. A similar stop 96 is provided at the front end of thread 58 to stop a forward edge 98 of thread 62 to prevent the jaws from binding in the fully closed position when there is no tool in chuck bore 26.

Thread 62 defines one turn around surface 64 of driving disk 60. A gap 100 between thread edges 94 and 98 has an angular width greater than the width of stop 92. This facilitates the chuck's assembly in that the driving disk may be placed directly down onto thread 58 over the stop. Rear sleeve 16 then prevents the driving disk from disengaging from the front sleeve when the chuck is in a fully opened position. While a slight gap is shown between the rear sleeve and the driving disk in FIG. 1, either or both of these components may be extended toward the other so that their edges 102 and 104 abut in the assembled chuck.

While the Figures illustrate an eight-pitch thread, it should be understood that a higher pitch may be used to improve the mechanical advantage. For example, in one preferred embodiment, a sixteen-pitch thread is provided on the front sleeve and driving disk. The driving disk thread includes four turns, and the stop 92 (FIG. 5) is therefore attached to the sleeve by any suitable means after the driving disk is threaded into the sleeve, for example by riveting, plastic welding or a slot/key interface.

Figure 10:
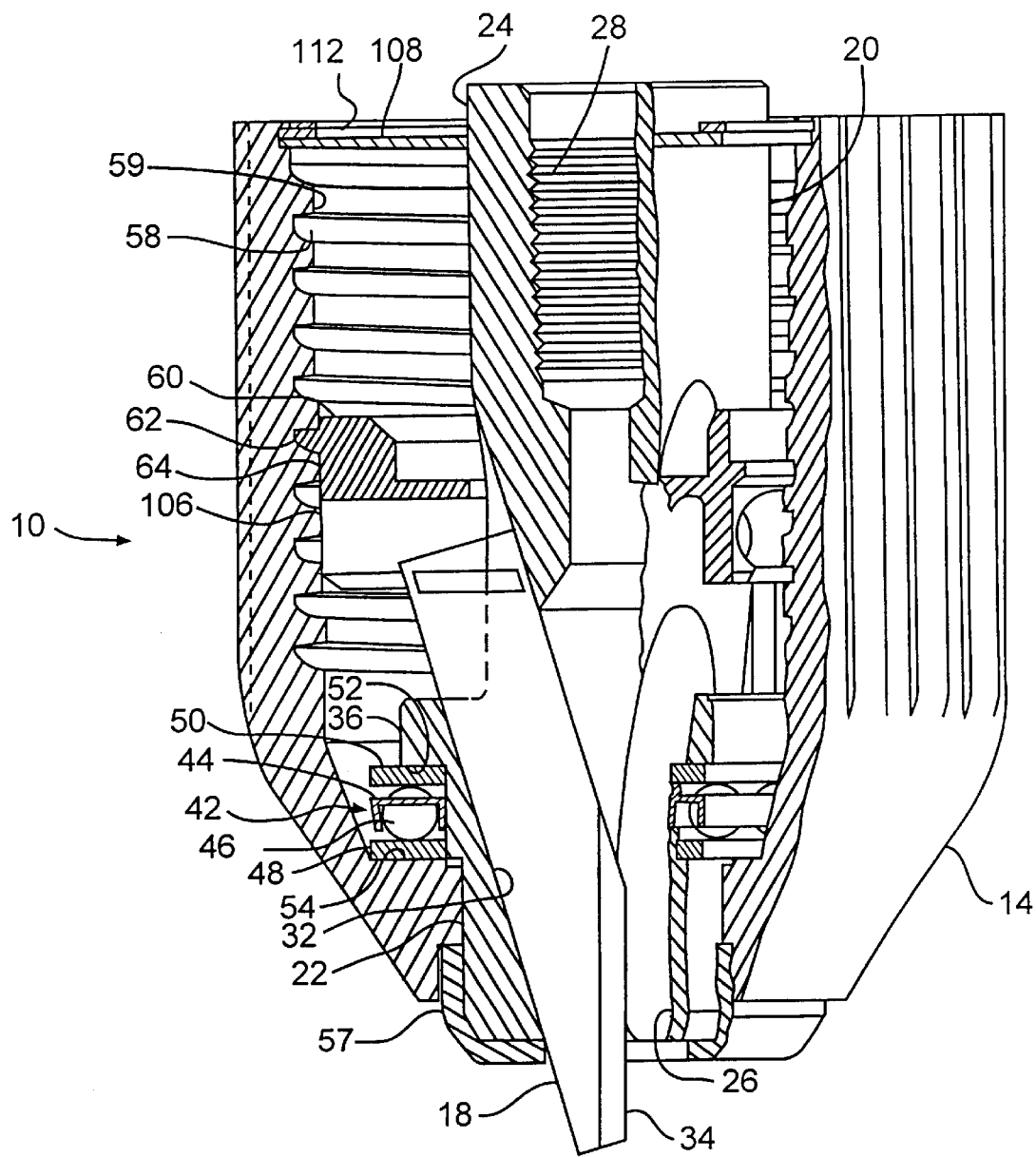
FIG. 10 is a front plan view, partly in section, of a chuck in accordance with a preferred embodiment of the present invention.

Referring now to FIG. 10, a chuck 10 in accordance with the present invention includes a sleeve 14 that extends from body nose section 22 to tail section 24. An axial bore 26 is formed in the nose section and is somewhat larger than the largest tool shank that the chuck is designed to accommodate.

Body 20 defines a threaded bore 28 in its tail section. Bore 28 is of a standard size to mate with the drive shaft of a powered or hand driver (not shown). While a threaded bore 28 is illustrated, such bore could be replaced with a tapered bore of a standard size to mate with a tapered drive shaft. The bores 26, 28 may communicate at a central region of body 20. The central region may be formed with a socket to accept a drive bit so that the body may be screwed onto the spindle by the bit.

Body 20 also defines three passageways 32 to respectively accommodate the three jaws 18. In a three-jaw configuration, each passageway, and therefore each jaw, is separated from each adjacent passageway by an arc of approximately 120°. The longitudinal axes of the passageways 32 and the jaws 28 are angled with respect to the chuck's longitudinal axis but intersect the chuck axis at a common point ahead of the chuck body. Each jaw 18 has a tool engaging face 34 that is generally parallel to the longitudinal axis of the chuck body.

Body 20 also includes a thrust ring member 36 that includes a ledge portion 40 that receives a bearing assembly 42. The bearing assembly includes a bearing cage 44 enclosing bearing balls 46 that forwardly bear, with respect to chuck body 20, on a forward washer 48 and rearwardly bear on a rearward washer 50. Rearward race 50 abuts a shoulder surface 52 formed between the raised and ledge portions of thrust ring 36. Forward race 48 bears in an axially forward direction against a shoulder 54 of sleeve 14.

Although the chuck as shown in FIG. 10 includes a single sleeve 14, it should be understood that it may also include an optional rear sleeve as shown in FIG. 1. In such an arrangement, tail section 24 of body 20 may include a rear cylindrical portion having a knurled surface thereon for receipt of the rear sleeve.

At the front end of the chuck, nose section 22 is beveled and is adapted to receive a nosepiece 57 for restraining sleeve 14 from forward axial movement with respect to the chuck body. Alternatively, a snap ring or other suitable mechanism may be used to axially restrain the sleeve. Nosepiece 57 may be pressed onto nose section 22 or attached in any other suitable manner. Rearward axial movement of the sleeve on the body is prevented by thrust ring 36 through bearing assembly 42.

The interior surface 59 of sleeve 14 defines female threads 58. The threads are in an eight pitch configuration along the length of sleeve 14 and define a curved forward surface. It should be understood, however, that any suitable thread shape or formation may be employed, for example including a modified square thread or a modified buttress thread.

A driving disk 60 includes a male thread 62 extending about an outer circumferential surface 64. Thread 62 has the same pitch as thread 58 so that when thread 62 is received by thread 58, relative rotation between sleeve 14 and driving disk 60 moves the driving disk axially within the sleeve. In particular where the driving disk is molded, thread 62 may have a shape that conforms with the curved surface of thread 58.

Figure 11:
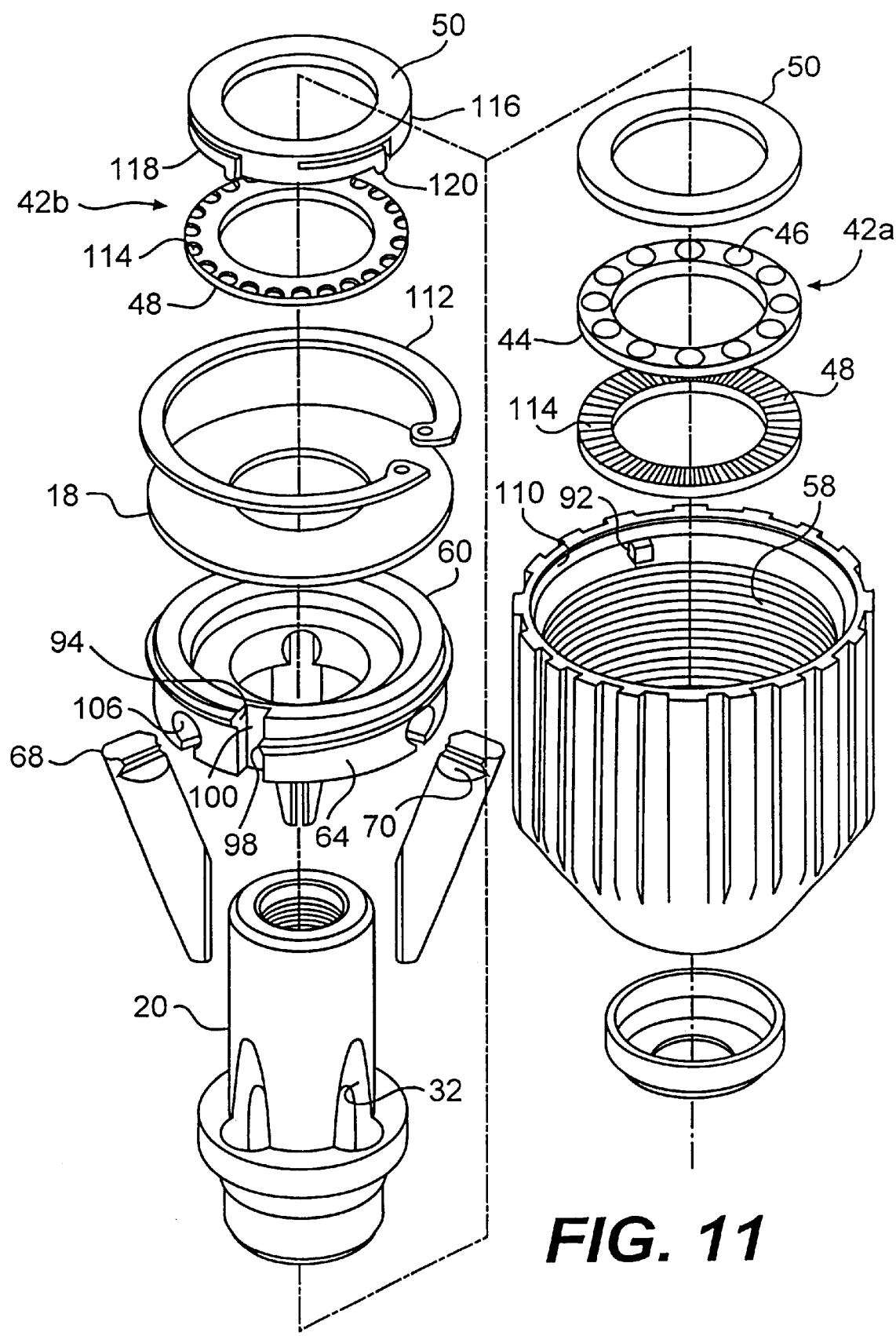
FIG. 11 is an exploded view of a chuck in accordance with a preferred embodiment of the present invention.
Figure 12:
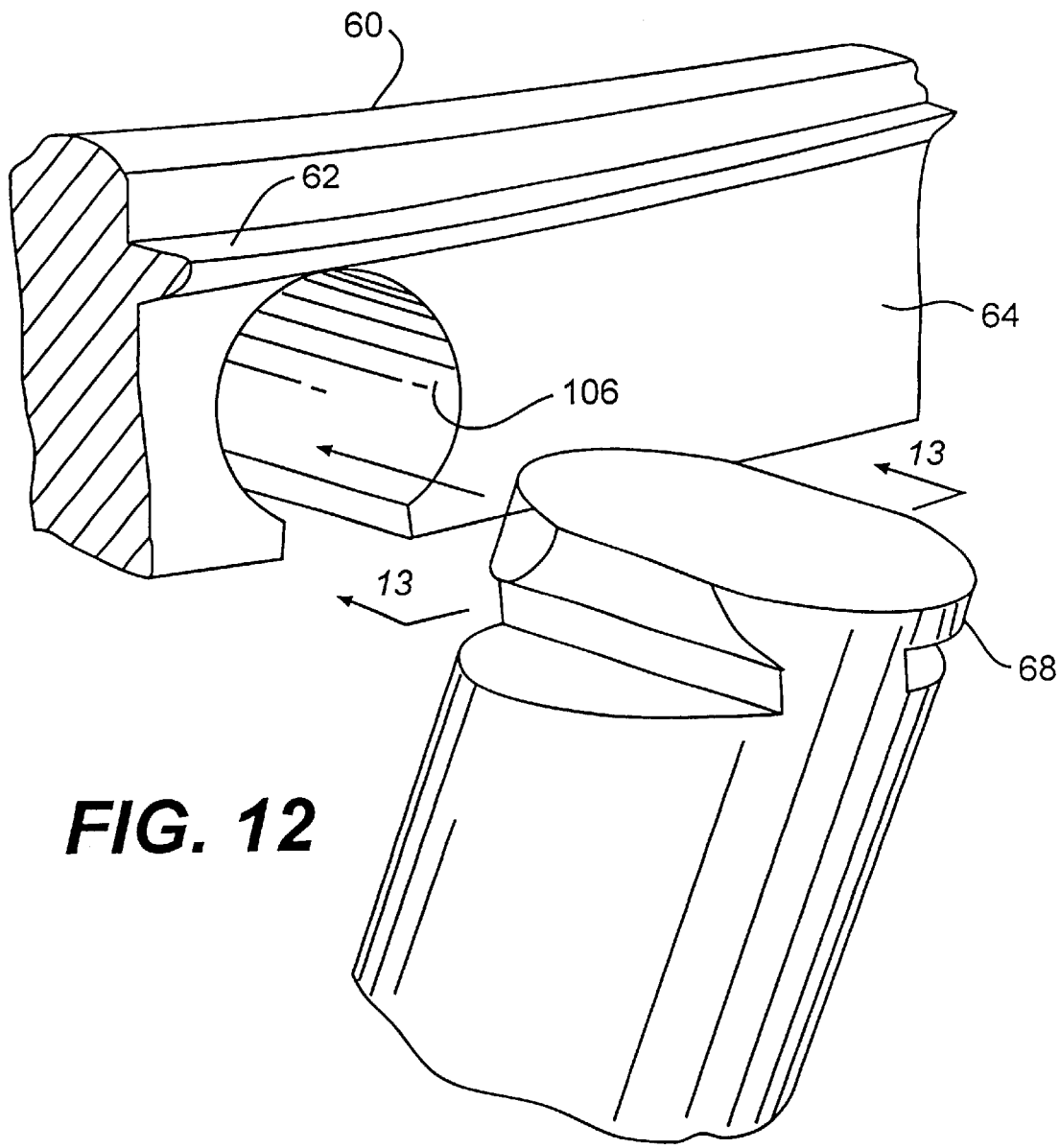
FIG. 12 is a partial perspective view of a driving disk and jaw of the chucks as in FIGS. 10 and 11.
Figure 13:
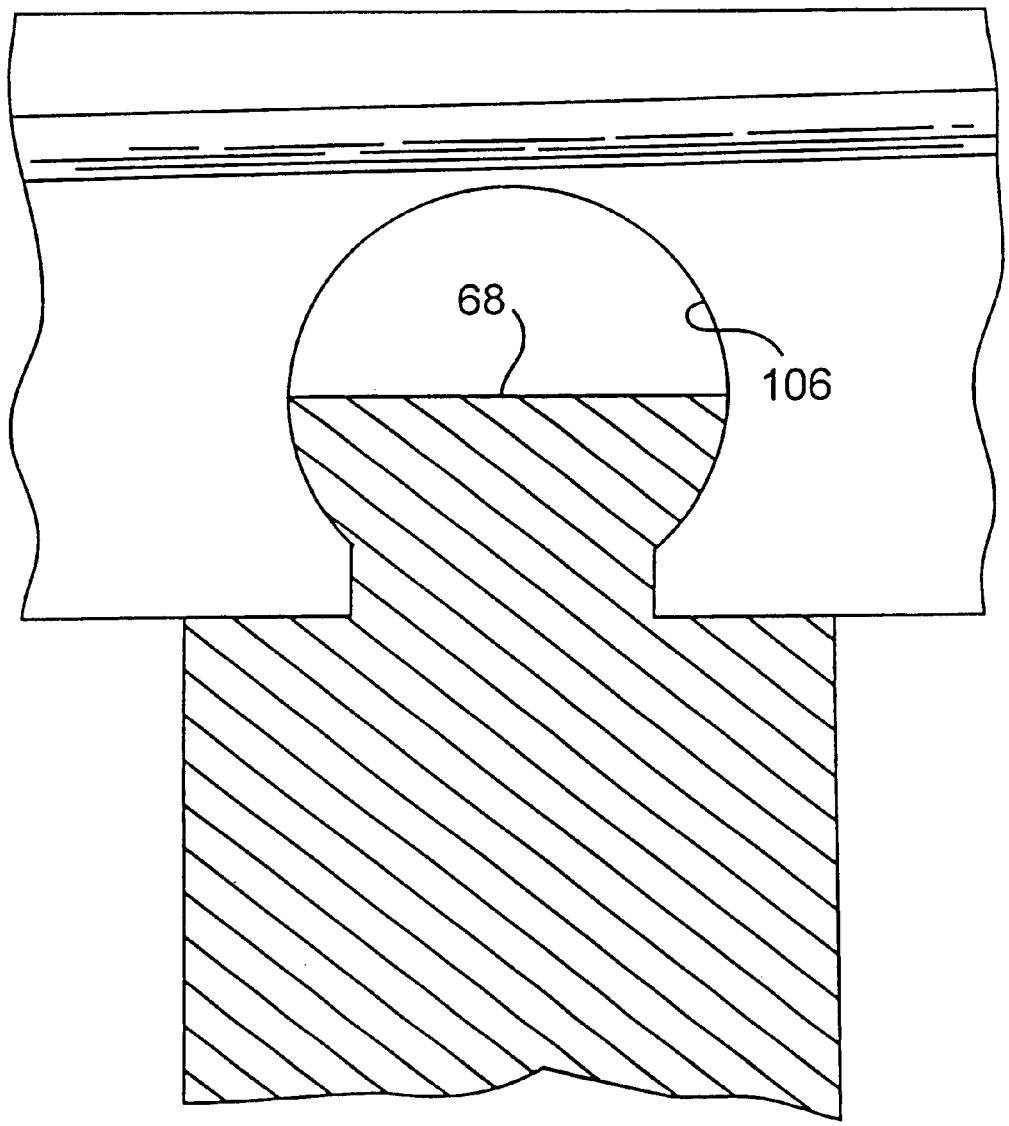
FIG. 13 is a cross-sectional view taken along the line 13—13 in FIG. 12.

Referring also to FIGS. 11, 12 and 13, driving disk 60 includes three equiangularly spaced apart radial slots 106 extending entirely radially through the disk. Slots 106 are cylindrical in shape and may be formed by boring radially inward into the driving disk outer surface with a suitable boring tool. As shown particularly in FIGS. 12 and 13, jaw end sections 68 are formed in a cooperating semi-circular shape so that slots 106 slidably receive the respective jaws. The slots allow the jaw ends to move radially as the driving disk moves the jaws between open and closed positions. A dry lubricant coating may be provided on the jaw ends and/or slots 106 to facilitate this movement. The cooperation between the jaw ends and slots 106 maintains the jaws at the proper angle with respect to the driving disk so that the jaws are maintained in alignment in the jaw passageways in the assembled chuck.

Rotation of sleeve 14 clockwise, when viewed from nose section 22, moves driving disk 60 axially forward with respect to the chuck axis, thereby moving jaws 18 to a closed position. Conversely, counterclockwise rotation of the front sleeve moves the jaws in an opening direction. Referring to FIG. 11, a stop 92 is provided at the rear edge of thread 58. When the jaws reach a fully opened position, for example as shown in the embodiment of FIG. 1, a rear edge 94 of thread 62 abuts stop 92. This prevents further rotation of the sleeve with respect to the driving disk. A similar stop (not shown) is provided at the front end of thread 58 to stop a forward edge 98 of thread 62 to prevent the jaws from binding in the fully closed position when there is no tool in the chuck bore.

Thread 62 defines one turn that extends slightly less than 360° around surface 64 of driving disk 60. A gap 100 between thread edges 94 and 98 has an angular width greater than the width of stop 92. This facilitates the chuck's assembly in that the driving disk may be placed directly down onto thread 58 over the stop. A back plate 108 secured in a groove 110 by a snap-ring 112 prevents the driving disk from disengaging from the sleeve when the chuck is in a fully opened position in which rear thread edge 94 abuts stop 92.

Bearing assembly 42 may comprise any suitable construction. FIG. 11, for example, illustrates two bearing configurations 42a and 42b. In the embodiment indicated at 42a, the washer that forms bearing race 48 includes radially aligned recesses 114 in the washer's rearward face so that each of bearing balls 46 are received in a respective recess 114.

As it is rotated, sleeve 14 exerts a relative rotational force between races 48 and 50. Normally, washer 48 carries balls 46 so that cage 44 rotates with washer 48. Before the jaws close on the tool, however, there is relatively little rearward axial force against washer 50. Thus, balls 46 slide against the washer, which remains in position against the chuck body. Where the frictional force between balls 46 and washer 50 is greater than that between sleeve 14 and washer 48, the entire bearing assembly remains rotationally held to the body as the sleeve rotates.

When the jaws close onto a tool shank, driving disk 60 exerts rearward axial force against sleeve 14, which in turn translates this force to the body through bearing 42a. At this point, the increased frictional force between balls 46 and race 50 causes the balls to rotate against the washer, which is rotationally held by friction to thrust ring 36. Since sleeve 14 rotationally drives washer 48 by friction, this causes balls 46 to roll out of their recesses 114 into the next recess. Continued rotation of sleeve 14 continues movement of the balls through successive recesses, causing a clicking sound that notifies the operator that the chuck is approaching a fully tightened position.

Figure 14:
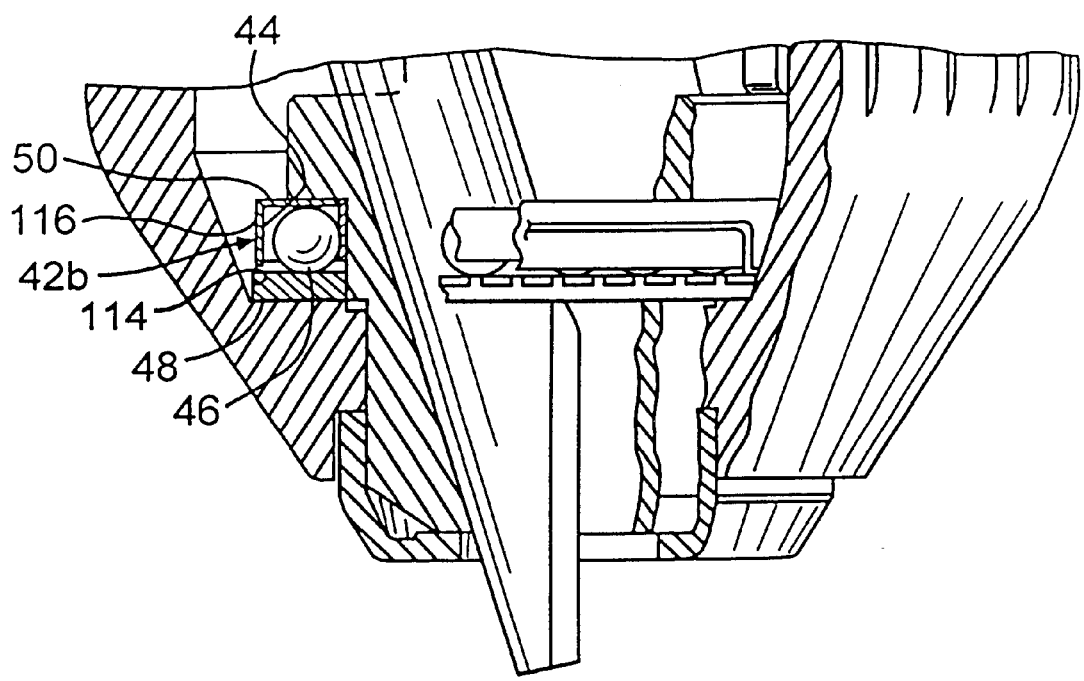
FIG. 14 is a partial sectional front plan view of the chuck and one of the bearings as in FIG. 11.

In another embodiment, and referring also to FIG. 14, bearing 42b includes a first race 48 having recesses 114 defined about the radially outward edge of its rearward face. Opposite race 50 includes a shroud 116 extending axially forward therefrom. The shroud defines a plurality of spring arms 118 biased axially forward toward washer 48 so that tabs 120 defined at the distal ends of arms 118 engage respective recesses 114. Thus, as sleeve 14 is rotated to a closed position, races 48 and 50 are rotationally linked to each other and rotate either with sleeve 14 or chuck body 20, depending on whether the sleeve or the body exerts the greater frictional force on the bearing assembly. As should be understood by those skilled in this art, this depends on the dimensions of the components and the materials from which they are made. For example, where the bearing assembly and the body are made of metal, but the sleeve is made of a polymer material, the bearing typically remains with the body as the sleeve rotates.

When the chuck jaws tighten onto a tool shank, however, frictional forces between washer 48 and sleeve 14 and between washer 50 and thrust ring 36 overcome the link between washers 48 and 50. Further rotation of sleeve 14 therefore rotates washer 48 with respect to washer 50, overcoming the biasing force of spring arms 118. Thus, the arms are deflected so that each tab 120 moves out of its recess 114 and into the next recess. Continued rotation of sleeve 14 moves tabs 120 in and out of successive recesses, creating a clicking sound notifying the user that the chuck is approaching a fully closed position.

Upon opening the chuck, having either bearing 42a or 42b, from a fully closed position, washers 48 and 50 initially rotate with respect to each other, again creating the clicking sound. As soon as the jaws release from the tool shank, however, the bearing assembly operates as described above prior to the fully closed position.

It should be understood that the bearing assembly according to the present invention may be constructed in any suitable manner. For example, the recesses may be formed as radially extending dimples in the front face of washer 48, as shown with respect to assemblies 42a and 42b in FIG. 11, or may comprise gaps between teeth extending radially outward from the washer's edge.

Figure 15:
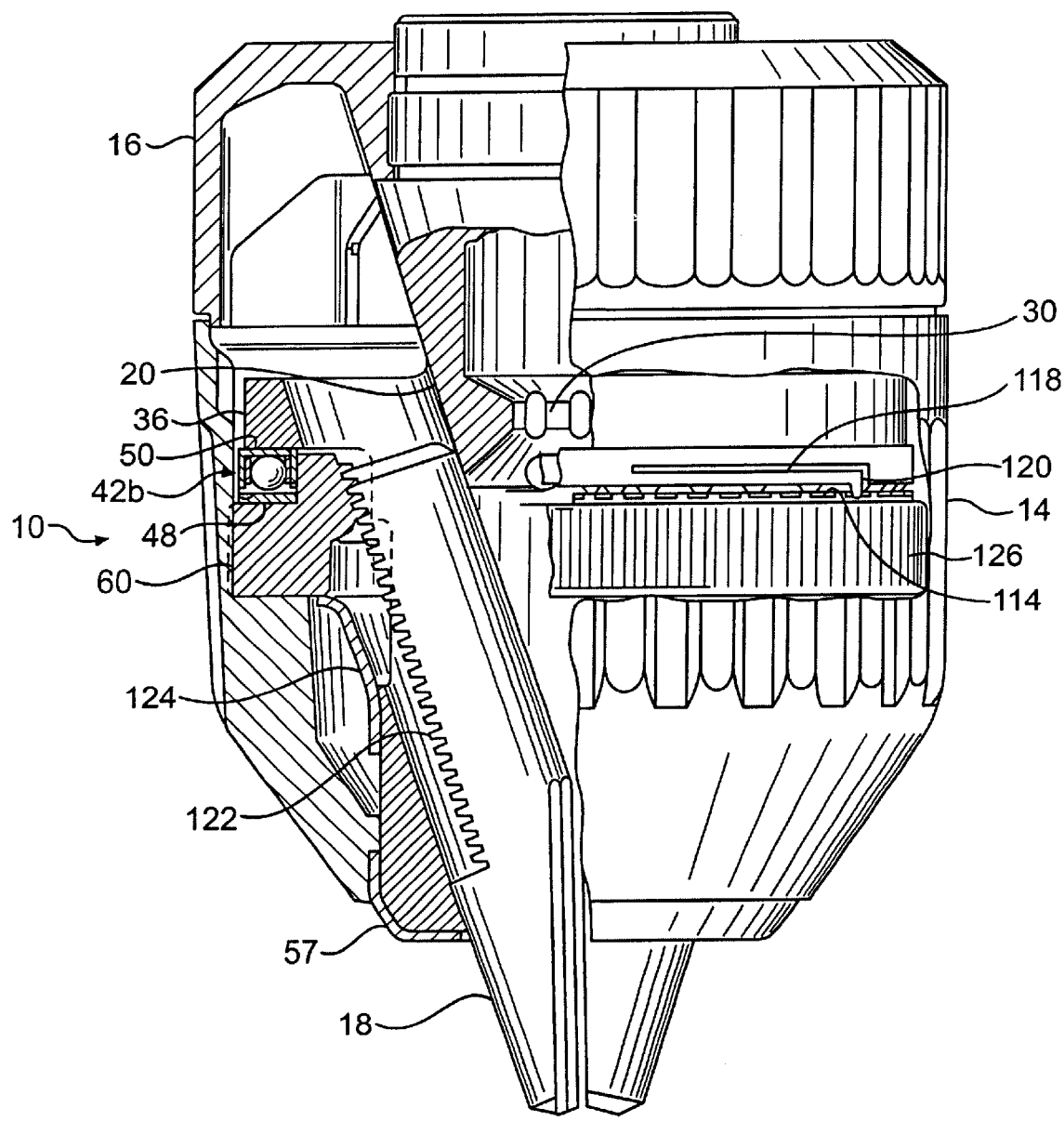
FIG. 15 is a front plan view, partly in section, of a chuck in accordance with a preferred embodiment of the present invention.

It should also be understood that bearing assemblies 42a and 42b as shown in FIG. 11 may be used in any suitable chuck configuration. For example, referring to FIG. 15, a chuck 10 in accordance with the present invention includes a front sleeve 14, an optional rear sleeve 16, a body 20 and a plurality of jaws 18. Body 20 is generally cylindrical in shape and includes a nose section and a tail section. An axial bore is formed in the nose section. The axial bore is somewhat larger than the largest tool shank that the chuck is designed to accommodate. The tail section includes a threaded bore of a standard size to mate with the drive shaft of a powered driver. The threaded bore could be replaced with a tapered bore of a standard size to mate with a tapered drive shaft. The nose and tail bores may meet in a central region 30 formed as a socket as discussed above.

A separate passageway is formed in body 20 to accommodate each jaw 18. In the embodiment illustrated in FIG. 15, three jaws 18 are employed, each separated from the adjacent jaw by an arc of approximately 120°. The longitudinal axes of the jaw passageways and jaws are angled with respect to the longitudinal axis of the chuck but intersect the chuck axis at a common point ahead of the chuck body. Each jaw has threads 122 on its outer surface. Threads 122 may be of any suitable type and pitch.

Body 20 includes a thrust ring member 36, which in a preferred embodiment forms an integral part of the body. The thrust ring includes a ledge portion that receives bearing assembly 42b. The thrust ring includes a plurality of jaw guideways in alignment with the jaw passageways in the body to permit movement of the corresponding jaws therethrough. The body nose section includes a beveled front portion that is adapted to receive a nosepiece 57 for maintaining front sleeve 14 axially in position.

A driving disk 60 is rotatably mounted with respect to the body and includes threads about an inner circumferential surface that engage threads 122 of jaws 18. In the illustrated embodiment, the driving disk is configured in one piece but could be formed in two or more pieces. When the driving disk is rotated with respect to body 20, the threaded interface between the driving disk and the jaws advances or retracts toward or away from the chuck axis, depending on the driving disk's rotational direction. The driving disk is rotated by sleeve 14, which is rotationally fixed to the driving disk by a press fit between the sleeve and a knurled surface 126 on the driving disk. A retainer 124 is pressed onto the body nose section and retains the driving disk axially in position with respect to the body.

The operation of bearing assembly 42a is similar to that described above with respect to the embodiment shown in FIG. 11. Prior to the chuck's tightening onto a tool, the bearing assembly rotates either with driving disk 60 or the body. When the chuck jaws tighten onto a tool shank, however, frictional forces between washer 48 and driving disk 60 and between washer 50 and thrust ring 36 overcome the link between washers 48 and 50. Further rotation of sleeve 14 therefore rotates washer 48 with respect to washer 50, overcoming the biasing force of spring arms 118. Thus, the arms are deflected so that each tab 120 moves out of its recess 114 and into the next recess. Continued rotation of sleeve 14 moves tabs 120 in and out of successive recesses, creating a clicking sound notifying the user that the chuck is approaching a fully closed position.

Upon opening the chuck from a fully closed position, washers 48 and 50 initially rotate with respect to each other, again creating the clicking sound. As soon as the jaws release from the tool shank, however, the bearing assembly operates as described above prior to the fully closed position.

While one or more preferred embodiments of the invention have been described above, it should be understood that any and all equivalent realizations of the present invention are included within the scope and spirit thereof. The embodiments depicted are presented by way of example only and are not intended as limitations upon the present invention. For example, bearing races 48 and 50 in FIGS. 10, 11 and 15 may be discrete components or may be integrally formed with driving disk, chuck body or sleeve, as appropriate. Thus, it should be understood by those of ordinary skill in this art that the present invention is not limited to these embodiments since modifications can be made. Therefore, it is contemplated that any and all such embodiments are included in the present invention as may fall within the literal and equivalent scope of the appended claims.

What is claimed is:

1. A chuck for use with a power driver having a rotatable spindle, said chuck comprising:

a generally cylindrical body defining a tail section configured to rotate with said spindle of said power driver and a nose section having an axial bore formed therein;

a plurality of jaws in communication with said axial bore;

a generally cylindrical sleeve rotatably mounted about said body;

a driving disk rotatably mounted about said body in communication with said sleeve so that said sleeve rotationally drives said driving disk and in driving engagement with said jaws so that rotation of said driving disk by said sleeve and with respect to said body moves said jaws toward or away from the axis of said axial bore, depending on the direction of said rotation, and so that said jaws are tightened to a final closed position through said rotation; and a bearing that is non-compressible axially with respect to said bore and that is disposed between said driving disk and said body so that rearward axial force is transferred from said driving disk to said body through said bearing when said jaws close onto a tool received in said axial bore, said bearing including
- a first race,
- a second race, and
- a plurality of bearing elements disposed between said first race and said second race, wherein said first race defines a plurality of recesses therein and wherein one of said second race and said bearing elements is disposed in communication with said first race so that, when said jaws close onto said tool and said first race and said second race rotate relative to each other, said one of said second race and said bearing elements engages successive said recesses.

2. The chuck as in claim 1, wherein said tail section defines an axial bore therein configured to mate with said drive shaft of said power driver.

3. The chuck as in claim 1, wherein said nose section defines a plurality of angularly disposed passageways intersecting said axial bore.

4. The chuck as in claim 1, including a radially extending thrust ring axially fixed to said body, wherein said bearing is disposed between said driving disk and said thrust ring.

5. The chuck as in claim 4, wherein said thrust ring is unitarily formed with said body.

6. The chuck as in claim 4, wherein each of said first race and said second race is separate from said driving disk and said thrust ring.

7. The chuck as in claim 1, wherein said first race engages said driving disk and said second race engages said body.

8. The chuck as in claim 1, wherein said bearing elements are disposed in communication with said first race so that, when said jaws close onto said tool and said first race and said second race rotate relative to each other, said bearing elements engage successive said recesses.

9. The chuck as in claim 1, wherein said bearing elements are ball bearings.

10. The chuck as in claim 8, wherein each said recess receives a respective said bearing element so that relative rotation between said first race and said second race drives said bearing elements to successive said recesses.

11. The chuck as in claim 1, wherein said second race is disposed in communication with said first race so that, when said jaws close onto said tool and said first race and said second race rotate relative to each other, said second race engages successive said recesses.

12. A chuck for use with a power driver having a rotatable spindle, said chuck comprising:
- a generally cylindrical body defining a tail section configured to rotate with said spindle of said power driver and a nose section having an axial bore formed therein;
- a plurality of jaws in communication with said axial bore;
- a driving disk rotatably mounted about said body in driving engagement with said jaws so that rotation of said driving disk with respect to said body moves said jaws toward or away from the axis of said axial bore, depending on the direction of said rotation; and
- a bearing disposed between said driving disk and said body so that rearward axial force is transferred from said driving disk to said body through said bearing when said jaws close onto a tool received in said axial bore, said bearing including
  - a first race,
  - a second race, and
  - a plurality of bearing elements disposed between said first race and said second race, wherein said first race defines a plurality of recesses therein and wherein one of said second race and said bearing elements is disposed in communication with said first race so that, when said jaws close onto said tool and said first race and said second race rotate relative to each other, said one of said second race and said bearing elements engages successive said recesses, and wherein said second race is disposed in communication with said first race so that, when said jaws close onto said tool and said first race and said second race rotate relative to each other, said second race engages successive said recesses, wherein said second race includes at least one deflectable tab that extends from said second race into a said recess so that relative rotation between said first race and said second race drives said tab to successive said recesses.

13. A chuck for use with a power driver having a rotatable spindle, said chuck comprising:
- a generally cylindrical body defining a tail section configured to rotate with said driver of said power driver and a nose section having an axial bore formed therein;
- a plurality of jaws in communication with said axial bore;
- a driving disk axially movably disposed about said body in driving engagement with said jaws so that axial movement of said driving disk with respect to said body moves said jaws toward or away from the axis of said axial bore, depending on the direction of said axial movement, said driving disk defining a threaded outer circumferential surface;
- a generally cylindrical sleeve rotatably mounted about said body and defining a threaded inner circumferential surface engaging said threaded outer surface of said driving disk so that relative rotation between said driving disk and said sleeve moves said driving disk axially with respect to said body and so that said jaws are tightened to a final closed position through said rotation; and
- a bearing that is non-compressible axially with respect to said bore and that is disposed between said body and sleeve so that rearward axial force is transferred from said sleeve to said body through said bearing when said jaws close onto a tool received in said axial bore, said bearing including
  - a first race,
  - a second race, and
  - a plurality of bearing elements disposed between said first race and said second race, wherein said first race defines a plurality of recesses therein and wherein one of said second race and said bearing elements is disposed in communication with said first race so that, when said jaws close onto said tool and said first race and said second race rotate relative to each other, said one of said second race and said bearing elements engages successive said recesses.

14. The chuck as in claim 13, wherein said tail section defines an axial bore therein configured to mate with said drive shaft of said power driver.

15. The chuck as in claim 13, wherein said nose section defines a plurality of angularly disposed passageways intersecting said axial bore.

16. The chuck as in claim 13, including a radially extending thrust ring axially fixed to said body, wherein said bearing is disposed between said sleeve and said thrust ring.

17. The chuck as in claim 16, wherein said thrust ring is unitarily formed with said body.

18. The chuck as in claim 16, wherein each of said first race and said second race is separate from said sleeve and said thrust ring.

19. The chuck as in claim 13, wherein said first race engages said sleeve and said second race engages said body.

20. The chuck as in claim 13, wherein said bearing elements are disposed in communication with said first race so that, when said jaws close onto said tool and said first race and said second race rotate relative to each other, said bearing elements engage successive said recesses.

21. The chuck as in claim 20, wherein each said recess receives a respective said bearing element so that relative rotation between said first race and said second race drives said bearing elements to successive said recesses.

22. The chuck as in claim 13, wherein said second race is disposed in communication with said first race so that, when said jaws close onto said tool and said first race and said second race rotate relative to each other, said second race engages successive said recesses.

23. The chuck as in claim 13,
wherein said driving disk defines a plurality of cylindrical slots extending at least partially radially therethrough, and
wherein each said jaw includes a portion thereof that is shaped cooperatively with respect to said cylindrical slot and that is received thereby so that said jaw is axially and rotationally fixed, and radially slidable, with respect to said driving disk.

24. A chuck for use with a power driver having a rotatable spindle, said chuck comprising:
a generally cylindrical body defining a tail section configured to rotate with said driver of said power driver and a nose section having an axial bore formed therein;
a plurality of jaws in communication with said axial bore;
a driving disk axially movably disposed about said body in driving engagement with said jaws so that axial movement of said driving disk with respect to said body moves said jaws toward or away from the axis of said axial bore, depending on the direction of said axial movement, said driving disk defining a threaded outer circumferential surface;
a generally cylindrical sleeve rotatably mounted about said body and defining a threaded inner circumferential surface engaging said threaded outer surface of said driving disk so that relative rotation between said driving disk and said sleeve moves said driving disk axially with respect to said body; and
a bearing disposed between said body and sleeve so that rearward axial force is transferred from said sleeve to said body through said bearing when said jaws close onto a tool received in said axial bore, said bearing including
a first race,
a second race, and
a plurality of bearing elements disposed between said first race and said second race,
wherein said first race defines a plurality of recesses therein and wherein one of said second race and said bearing elements is disposed in communication with said first race so that, when said jaws close onto said tool and said first race and said second race rotate relative to each other, said one of said second race and said bearing elements engages successive said recesses,
wherein said second race is disposed in communication with said first race so that, when said jaws close onto said tool and said first race and said second race rotate relative to each other, said second race engages successive said recesses, and
wherein said second race includes at least one deflectable tab that extends from said second race into a said recess so that relative rotation between said first race and said second race driven said tab to successive said recesses.

25. A chuck for use with a power driver having a rotatable spindle, said chuck comprising:
a generally cylindrical body defining a tail section configured to rotate with said driver of said power driver and a nose section having an axial bore formed therein;
a plurality of jaws in communication with said axial bore;
a driving disk axially movably disposed about said body in driving engagement with said jaws so that axial movement of said driving disk with respect to said body moves said jaws toward or away from the axis of said axial bore, depending on the direction of said axial movement, said driving disk defining a threaded outer circumferential surface;
a generally cylindrical sleeve rotatably mounted about said body and defining a threaded inner circumferential surface engaging said threaded outer surface of said driving disk so that relative rotation between said driving disk and said sleeve moves said driving disk axially with respect to said body; and
a bearing disposed between said body and sleeve so that rearward axial force is transferred from said sleeve to said body through said bearing when said jaws close onto a tool received in said axial bore, said bearing including
a first race,
a second race, and
a plurality of bearing elements disposed between said first race and said second race,
wherein said first race defines a plurality of recesses therein and wherein one of said second race and said bearing elements is disposed in communication with said first race so that, when said jaws close onto said tool and said first race and said second race rotate relative to each other, said one of said second race and said bearing elements engages successive said recesses, and
wherein said outer circumferential surface of said driving disk defines a discrete thread extending at most 360° about said circumferential surface.

26. The chuck as in claim 25, wherein said thread extends less than 360° about said outer circumferential surface of said driving disk so that said thread defines a gap between a rotationally forward edge of said thread and a rotationally rearward edge of said thread.

27. The chuck as in claim 25, including a first stop disposed at a rearward portion of said sleeve so that said stop blocks rearward movement of said driving disk beyond said stop.

28. The chuck as in claim 26, including a first stop disposed at a rearward portion of said threaded inner circumferential surface of said sleeve so that said stop blocks rearward movement of said driving disk, at said rearward edge of said thread, beyond said stop.

29. The chuck as in claim 28, wherein said first stop has a width less than the width of said gap.

* * * * *

UNITED STATES PATENT AND TRADEMARK OFFICE
CERTIFICATE OF CORRECTION

PATENT NO. : 6,402,160 B1
DATED : June 11, 2002
INVENTOR(S) : Robert A. Grogan et al.

It is certified that error appears in the above-identified patent and that said Letters Patent is hereby corrected as shown below:

Column 12,
Line 8, please delete the word "and"
Line 13, after "said second race engages successive said recesses," please add the word -- and --

Column 14,
Line 7, please change "driven" to -- drives --

Signed and Sealed this

Eighth Day of March, 2005

JON W. DUDAS
*Director of the United States Patent and Trademark Office*